United States Patent
Theogaraj et al.

(10) Patent No.: US 10,164,824 B2
(45) Date of Patent: Dec. 25, 2018

(54) INDICATING A MASTER NETWORK CONTROLLER IN A VIRTUAL ROUTER REDUNDANCY PROTOCOL

(71) Applicant: Aruba Networks, Inc., Sunnyvale, CA (US)

(72) Inventors: Isaac Theogaraj, Bangalore (IN); Harsha Nagaraja, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/845,511

(22) Filed: Dec. 18, 2017

(65) Prior Publication Data

US 2018/0123868 A1    May 3, 2018

Related U.S. Application Data

(63) Continuation of application No. 15/017,024, filed on Feb. 5, 2016, now Pat. No. 9,871,690.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/24* | (2006.01) |
| *H04L 12/701* | (2013.01) |

(52) U.S. Cl.
CPC .......... *H04L 41/0654* (2013.01); *H04L 45/00* (2013.01)

(58) Field of Classification Search
None
See application file for complete search history.

(56) References Cited

U.S. PATENT DOCUMENTS

| | | |
|---|---|---|
| 7,486,610 B1 | 2/2009 | Bhupalam et al. |
| 7,929,420 B2 | 4/2011 | Jesuraj |
| (Continued) | | |

FOREIGN PATENT DOCUMENTS

| | | |
|---|---|---|
| EP | 1601140 A2 | 11/2005 |

OTHER PUBLICATIONS

"Improving the Convergence Time for VRRP," Jul. 30, 2013, pp. 1-2, Juniper Networks.

*Primary Examiner* — Idowu O Osifade
(74) *Attorney, Agent, or Firm* — Hewlett Packard Enterprise Patent Department

(57) ABSTRACT

The present disclosure relates to a network device that indicates a master network controller in a virtual redundant router protocol (VRRP) peer. In example implementations, the network device determines a bake-off time and refrains from sending packets during the bake-off time to a network. Also, the network device determines whether a first packet is received from the network. If either the bake-off time expires or the first packet is received from the network, the network device determines whether a spanning tree protocol (STP) convergence has completed. If so, the network device starts a VRRP state machine. If both the STP convergence has completed and the VRRP state machine has been started, the network device transmits a broadcast message indicating that the network device acts as a master network controller in the network.

20 Claims, 9 Drawing Sheets

(56) References Cited

U.S. PATENT DOCUMENTS

| | | |
|---|---|---|
| 9,100,274 B1 | 8/2015 | Ghosh |
| 2008/0275975 A1* | 11/2008 | Pandey .................. H04L 49/40 709/223 |
| 2014/0347976 A1 | 11/2014 | Keesara et al. |
| 2015/0200839 A1 | 7/2015 | Huang et al. |
| 2016/0085560 A1* | 3/2016 | Gourlay ................ G06F 9/4416 713/2 |

* cited by examiner

INDICATING A MASTER NETWORK CONTROLLER IN A VIRTUAL ROUTER REDUNDANCY PROTOCOL

This application is a Continuation of U.S. application Ser. No. 15/017,024 filed on Feb. 6, 2016, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Virtual Router Redundancy Protocol (VRRP) generally refers to a redundancy solution, where pairs of network devices, such as network controllers, act in an active mode or a standby mode. VRRP eliminates a single point of failure by providing an election mechanism, among the network controllers, to elect a VRRP master network controller. The master network controller is configured with a virtual Internet Protocol (IP) address for the VRRP instance. When the master network controller becomes unavailable, a backup or standby network controller steps in acting as the master network controller, and takes ownership of the virtual IP address. Nevertheless, when the VRRP pre-emption is disabled, a network controller may inadvertently pre-empt a pre-existing VRRP master network controller.

BRIEF DESCRIPTION OF THE DRAWINGS

The following detailed description references the drawings, wherein.

DETAILED DESCRIPTION

Figure 1:
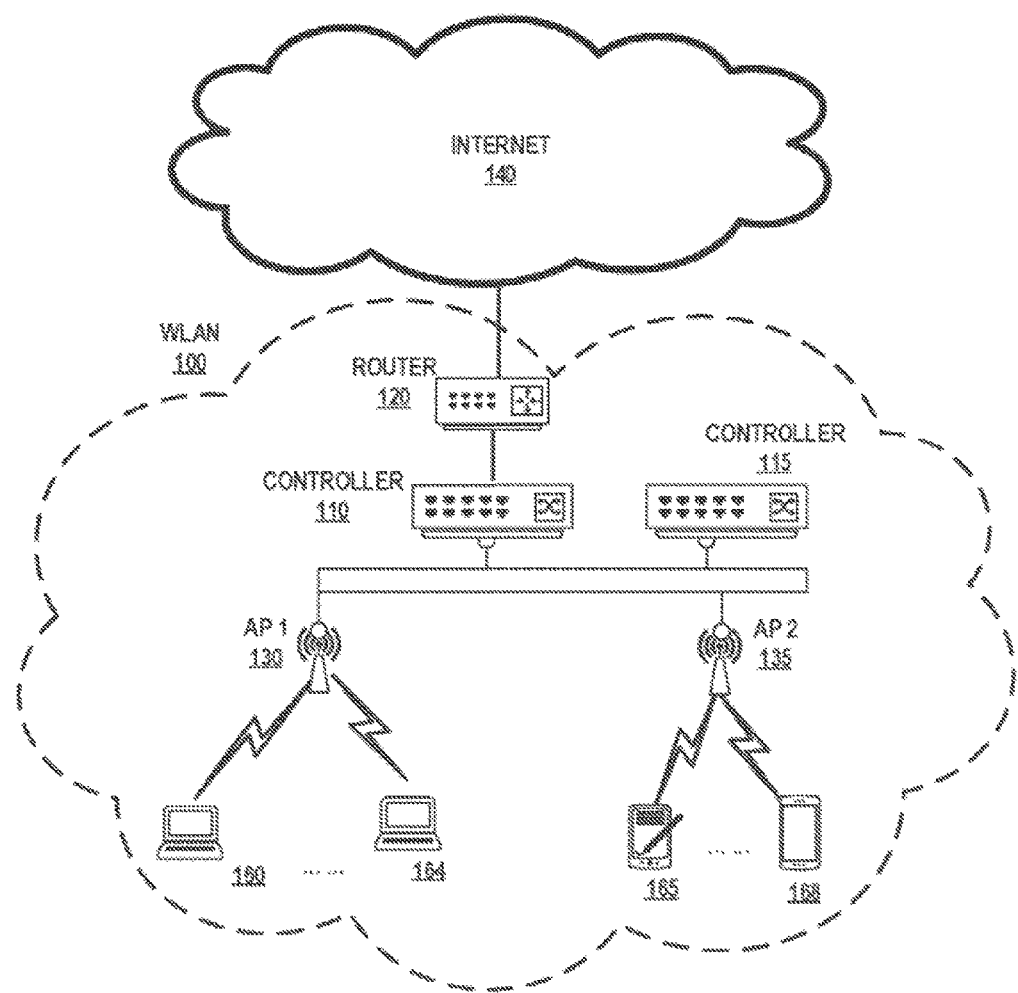
FIG. 1 is a block diagram of an example networking environment for deploying virtual router redundancy protocol peers in a wireless local area network.

In the following description, several specific details are presented to provide a thorough understanding. While the context of the disclosure is directed to network resource redundancy management in wireless local area network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. As used herein, the term "implementation" generally refers an implementation that serves to illustrate by way of example but not limitation. It should be understood that this disclosure covers all modifications, equivalents, and alternatives falling within the spirit and scope of the present disclosure.

Overview

The present disclosure relates to network resource redundancy management in a wireless local area network. In particular, the present disclosure relates to avoiding inadvertent pre-emptions over a virtual router redundancy protocol peer in a wireless local area network.

Specifically, of the VRRP pre-emption is disabled and all network controllers share the same priority, then the first network controller that boots up becomes the master network controller. On the other hand, if the VRRP pre-emption is enabled and all network controllers share the same priority, the network controller with the highest IP address becomes the master network controller after booting up.

Nevertheless, when the VRRP pre-emption is disabled, a network controller may inadvertently pre-empt a pre-existing VRRP master network controller. This is because the network controller may not receive the VRRP advertisements that the VRRP master network controller sends to the network immediately after the network controller powers up. The network controller usually waits for a predetermined period of time after it powers up. Since the upstream port takes time to converge on spanning tree protocol (STP), the network controller may not receive any messages (e.g., VRRP advertisement messages) from the VRRP master network controller during the predetermined period of time. Thus, after the predetermined period of time expires, the network controller incorrectly presumes that the VRRP master network controller is down and transitions to the master state.

With the solution provided herein, a network device determines a bake-off time and refrains from sending packets during the bake-off time to a network. Also, the disclosed network device determines whether a first packet has been received from the network. If the bake-off time has expired or if the first packet has been received from the network, the disclosed network device determines that a spanning tree protocol (STP) convergence has completed, and starts a virtual router redundancy protocol (VRRP) state machine. Furthermore, if both the STP convergence has completed and the VRRP state machine has been started, the disclosed network device transmits a heartbeat message to the network. The heartbeat message indicates that the disclosed network device is acting as a master network controller in the network.

Computing Environment

FIG. 1 shows an example networking environment for deploying virtual router redundancy protocol peers in a wireless local area network. FIG. 1 includes a router 120 that connects to one or more network controllers (e.g. network controller 110 and network controller 115) in a wireless local area network (WLAN) 100. WLAN 100 is also connected to Internet 140.

As used herein, "wireless local area network" (WLAN) generally refers to a communications network that links two or more devices using some wireless distribution mechanisms (for example, spread-spectrum or orthogonal frequency-division multiplexing radio). WLAN usually provides a connection through an access point to the Internet; and thus, providing users with the mobility to move around within a local coverage area and still stay connected to the network.

Network controller 110 and/or network controller 115 are communicatively coupled with one or more access points, such as AP1 130 and AP2 135, to provide wireless network services to a number of wireless client devices, such as client devices 160-164 and client devices 165-168.

As used herein, "access point" (AP) generally refers to receiving points for any known or convenient wireless access technology which may later become known. Specifically, the term AP is not intended to be limited to IEEE 802.11-based APs. An AP generally functions as an electronic device that is adapted to allow wireless devices to connect to a wired network via various communication standards.

Network according to the present disclosure may operate on a private network including one or more local area networks. The local area networks may be adapted to allow wireless access, thereby operating as a wireless local area network (WLAN). In some implementations, the one or more local area networks may share the same extended service set (ESS) although each network corresponds to a unique basic service set (BSS) identifier.

In addition, network depicted in FIG. 1 may include multiple network control plane devices, such as network controllers, switches, or routers capable of controlling networking functions. Each network control plane device may be located in a separate sub-network. The network control plane device may manage one or more network management devices, such as access points or network servers, within the sub-network.

In some implementations, network controllers (e.g., network controller 110 and network controller 115) act in an active or standby mode according to a virtual router redundancy protocol (VRRP). For example, network controller 110 may be the active master network controller managing the APs in WLAN 100, whereas network controller 115 may be the standby network controller that pairs with network controller 110 in the VRRP. Master network controller 110 owns a preconfigured virtual IP address. In the event that network controller 110 fails, network controller 115 will transition into the master mode and serve as the master network controller for WLAN 100 using the preconfigured virtual IP address. Because all other network elements, such as APs and network controllers, can be configured to access the same virtual IP address, the failover of the master network controller from network controller 110 to network controller 115 is transparent to other elements of the network.

Moreover, in the example network depicted in FIG. 1, a number of client devices are connected to the access points in WLAN 100. For example, client devices 160-164 are associated with AP1 130, and client devices 165-168 are associated with AP2 135. Note that client devices may be connected to the access points via either wired or wireless connections.

As used herein, the term "link" or "connection" (or used descriptively as "connected") is generally defined as a communication pathway established over an information-carrying medium. The "link" or "connection" may be a wired interconnect, wherein the medium is a physical medium (e.g., electrical wire, optical fiber, cable, bus traces, etc.), a wireless interconnect (e.g., air in combination with wireless signaling technology), or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames, or cells.

VRRP Redundancy

In an example network, the APs are managed by a network controller. Generally, the APs tunnel data to the network controller, which processes the data by performing operations, including but not limited to, encryption, decryption, bridging, forwarding, etc. Using the VRRP to create a network controller redundancy involves creating both local network controller redundancy, as well as master network controller redundancy.

1. Local Network Controller Redundancy

Figure 2A:
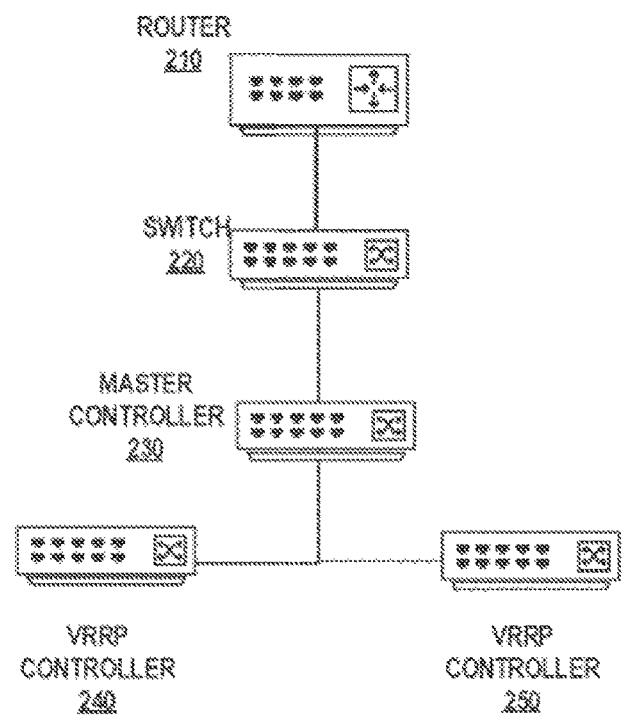
FIGS. 2A-2B are block diagrams of example networking environments providing master controller redundancy or local controller redundancy based on the virtual router redundancy protocol.

FIG. 2A illustrates an example local network controller redundancy based on the VRRP. FIG. 2A includes at least a router 210, a switch 220, a master network controller 230, and a pair of local network controllers, such as VRRP controller 240 and VRRP controller 250.

Local network controller redundancy generally refers to providing redundancy for a first network controller (e.g., VRRP controller 240) such that the APs failover to a backup network controller (e.g., VRRP controller 250) if the first network controller (e.g., VRRP controller 240) becomes unavailable.

Local controller redundancy is provided by running the VRRP between a pair of network controllers (e.g., VRRP controller 240 and VRRP controller 250). The APs are then configured to connect to the virtual IP address configured for the VRRP instance. The local network controller redundancy is configured based on at least the following parameters: (1) a Virtual Local Area Network (VLAN) identifier on the local controllers that are on the same Layer-2 network, and (2) the virtual IP address to be used for the VRRP instance.

(2) Master Controller Redundancy

Figure 2B:
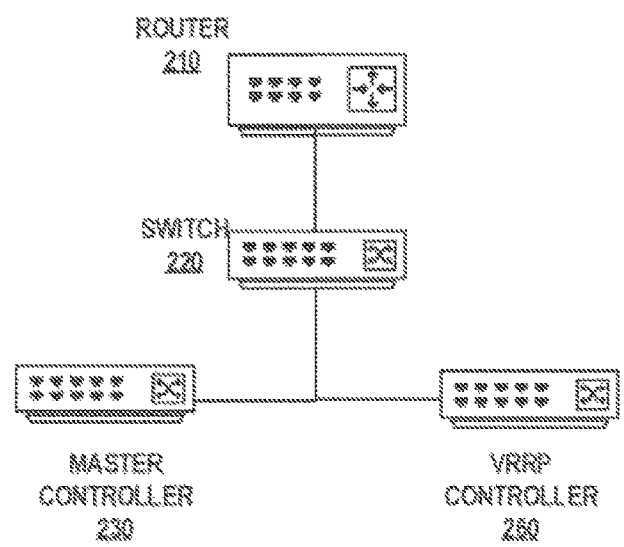

FIG. 2B illustrates an example master controller redundancy based on the VRRP. FIG. 2B includes at least a router 210, a switch 220, a master network controller 230, and a VRRP standby controller 260.

Master network controller 230 generally refers to a network controller that acts as a single point of configuration for global policies, such as firewall policies, authentication parameters, radio frequency (RF) configuration, to ease the configuration and maintenance of a wireless network, etc. Moreover, master network controller 230 maintains a database related to the wireless network that is used to make any adjustments in reaction to events that cause a change in the environment, such as an AP becoming unavailable. Master network controller 230 is also responsible for providing the configuration for any AP to complete its boot process. If master network controller 230 becomes unavailable, the network continues to run without any interruption. However, any change in the network topology or configuration typically will need the availability of master network controller 230.

To maintain a highly redundant network, a network administrator can use a second network controller (e.g., VRRP Controller 260) to act as a standby network controller for master network controller 230. Specifically, the network administrator can use the VRRP to provide for the master network controller redundancy in the same fashion as for the local network controller redundancy. Furthermore, master network controller 230 is set with a higher priority than the standby network controller, e.g., VRRP controller 260.

(3) VRRP Redundancy Configurations

The following section is a configuration example for master network controller 230.

vrrp 22
vlan 22
ip address 10.200.22.254
priority 110
preempt
authentication password
description Preferred-Master
tracking master-up-time 30 add 20
no shutdown The following is an example for the corresponding VRRP configuration for the peer network controller (e.g., VRRP Controller 260).

vrrp 22
vlan 22
ip address 10.200.22.254
priority 100
preempt
authentication password
description Backup-Master
tracking master-up-time 30 add 20
no shutdown Table 1 illustrates example VRRP parameters for configuring the master network controllers and local network controllers.

TABLE 1

| Parameter | Description |
| --- | --- |
| Virtual Router ID | An identifier that uniquely identifies a VRRP instance. |
| Advertisement Interval | An interval, in seconds, between successive VRRP advertisements sent by the current master network controller. A default interval time may be configured for, e.g., 1 second. |
| Authentication Password | An optional password that can be used to authenticate VRRP peers in their advertisement messages. |
| Description | An optional text description to describe the VRRP instance. |
| IP Address | A virtual IP address that will be owned by the elected VRRP master network controller. |
| Router Pre-emption | Enabling this option means that a network controller can take over the role of master network controller, if it detects a network controller associated with a lower priority is currently acting as the master network controller. |
| Delay | A value for the delay timer, which is triggered when the VRRP state machine moves out of a backup state or an initial state to become a master state, and when the router pre-emption is enabled. When the delay timer is triggered, it forces the network controller to wait for a predetermined period of time, so that all the applications are ready before booting up. This prevents the APs from connecting to the network controller before the network controller can receive them. On the other hand, if there is a VRRP advertisement message from another network controller, the receipt of the VRRP advertisement message stops the delay timer and prevents the network controller from transitioning into the master network controller. |
| Priority | Priority level of the VRRP instance for the network |

TABLE 1-continued

| Parameter | Description |
| --- | --- |
| | controller. This value is used in the election mechanism for the master network controller. |
| Tracking | A mechanism that modifies a specified value to the priority after a network controller has been the master network controller for the VRRP instance in order to avoid failing over to a backup master network controller during transient failures. |
| Admin State | Administrative state of the VRRP instance. |
| VLAN | VLAN on which the VRRP protocol will run. |

Table 2 illustrates example commands to associate the VRRP instance with the master network controller redundancy.

TABLE 2

| Command | Description |
| --- | --- |
| master-redundancy | Enter the master-redundancy context. |
| master-vrrp <id> | Associates a VRRP instance with master network controller redundancy. Id refers to the virtual router ID of the VRRP instance. |
| peer-ip-address <ipaddr> ipsec <key> | Loopback IP address of the peer VRRP controller for master redundancy. The pre-shared key secures communication between the master network controller and the peer VRRP controller. |
| masterip <ipaddr> ipsec <key> | Configures the master virtual IP address and pre-shared key on a local network controller for communications with the master network controller. |

Tracking can be based on one of the following factors:

(1) Master Up Time

Master up time generally refers to the length for which the current master network controller has been the master in the WLAN. The value of duration is configured by the network administrator and is usually long enough such that the database gathered in the time is too important to be lost.

(2) VRRP Master State Priority

VRRP master state priority generally refers to the master state of another VRRP controller.

(3) Interface States of Controller

VLAN or interface may prevent asymmetric routing by tracking multiple VRRP instances. Specifically, the priority of the VRRP interface determined by the sub-values can increase or decrease based on the operational and transitional states of the specified VLAN or Fast Ethernet/Gigabit Ethernet port. When the VLAN or interface comes up again, the value is restored to the previous priority level. For example, a network administrator can track an interface that connects to a default gateway. Further, the network administrator can configure the VRRP priority to decrease and trigger a VRRP master re-election if the interface goes down. This not only prevents network traffic from being forwarded, but also reduces VRRP processing.

VRRP Pre-emption

Figure 3:
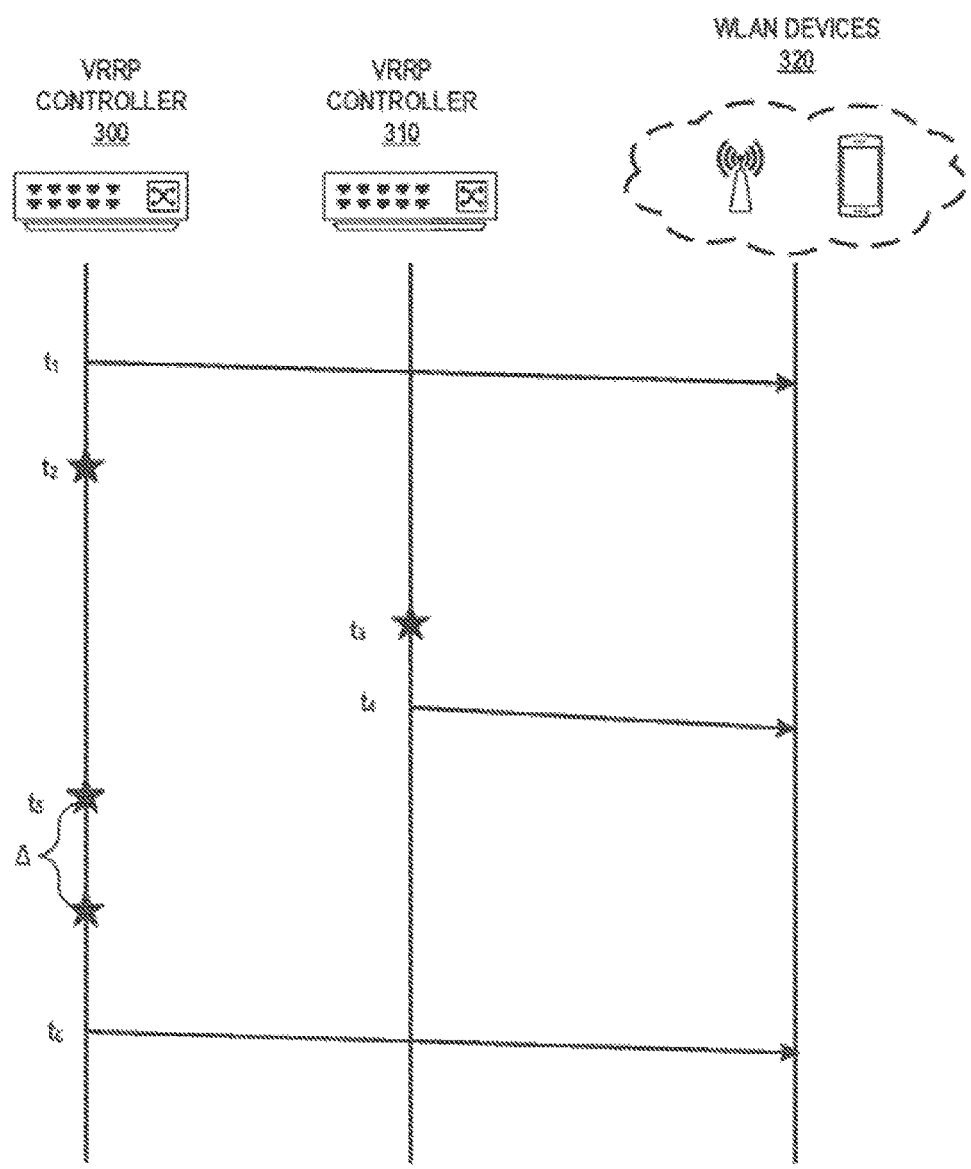
FIG. 3 is a sequence diagram of an example instance of pre-emptions over a virtual router redundancy protocol peer.

FIG. 3 is a sequence diagram of an example instance of pre-emptions over a virtual router redundancy protocol peer. FIG. 3 includes VRRP Controller 300, VRRP Controller 310, and a plurality of WLAN devices 320 that include both access points (APs) and client devices. Different network controllers may be designated with different priorities. For example, a master network controller typically will be given a higher priority than a standby or backup network controller. Here, assuming that VRRP Controller 300 is the master network controller, and VRRP Controller 310 is the standby or backup network controller.

Moreover, the master network controller periodically sends a VRRP advertisement message to other network controllers in the WLAN. When the other network controllers receives a VRRP advertisement message with a higher priority than the priority associated with themselves, the other network controllers will recognize that the master network controller is currently active and will refrain from sending any broadcast messages used for master network controller election. Note that the VRRP advertisement message is a multicast message that does not need any acknowledgement from network peers.

As mentioned above, Router Pre-emption is a configurable field. When Router Pre-emption is enabled, the network controller associated with a high priority will always become the master network controller. In some implementations, after booting up, the network controller associated with a high priority becomes the master network controller. In some implementations, after the network becomes temporarily unavailable, the network controller associated with a high priority becomes the master network controller. In some implementations, when a port is brought up after a period of downtime, the network controller associated with a high priority becomes the master network controller. In the above scenarios, the network controller associated with a high priority will become the master network controller, even though the network controller associated with a high priority receives a VRRP advertisement message indicating that another network controller associated with a low priority is currently acting as the master network controller.

On the other hand, when Router Pre-emption is disabled, a network controller associated with a high priority may initially act as the master network controller. However, a standby network controller may become the master network controller later when the initial master network controller is down. Subsequently, after the network controller associated with the high priority boots up again, the network administrator may not want to switch the master network controller. For example, it may be desirable to maintain the current states and allow the network controller associated with a low priority continue serving WLAN devices 320 without interrupting the active processes. In these scenarios, the network controller associated with a high priority will refrain from sending any heartbeat message for master network controller election.

As illustrated in FIG. 3, at time point $t_1$, VRRP Controller 300 acting as the master network controller sends control messages to WLAN devices 320 and manages WLAN devices 320. Subsequently, at time point $t_2$, VRRP Controller 300 (i.e., the master network controller) becomes unavailable. At time point $t_3$, VRRP Controller 310, which is associated with a lower priority than VRRP Controller 300, after having waited for a predetermined period of time without receiving any message from VRRP Controller 300 (i.e., the master network controller), presumes that there is no master network controller in the network and transitions to the master state. At time point $t_4$, VRRP Controller 310 becomes the master network controller and sends out control messages to WLAN devices 320.

Shortly after VRRP Controller 310 becomes the master network controller, at time point $t_5$, VRRP Controller 300, which is associated with a higher priority than VRRP Controller 310, boots up again. VRRP Controller 300 will wait for a predetermined period of time, e.g., $\Delta$ seconds. If during $\Delta$ seconds, VRRP Controller 300 does not receive any message from the current master network controller (i.e., VRRP Controller 310), then VRRP Controller 300 will pre-empt VRRP Controller 310 and become the master network controller. As a result, at time point $t_6$, VRRP Controller 300 begins to send control messages to WLAN devices 320.

Note that, in the above example, the Router Pre-emption is disabled. Nevertheless, when a master network controller (e.g., VRRP Controller 300) is transiently unavailable, the standby or backup network controller (e.g., VRRP Controller 310) in the WLAN may mistakenly presume that there is no master network controller in the network and becomes the master network controller in the WLAN. Because the master network controller (e.g., VRRP Controller 300) associated with a high priority is unavailable only for a short period of time, the change of master network controller causes disruption of processes, and thus is undesirable.

Moreover, when VRRP Controller 300 boots up again, because VRRP Controller 310 already becomes the master network controller, VRRP Controller 300 should refrain from sending heartbeat messages to become the master network controller when the Router Pre-emption is disabled. In the real world, however, the VRRP packet processing may experience various delays; the network spanning tree protocol (STP) convergence may take a long time; etc. Accordingly, VRRP Controller 300 may not receive the periodical VRRP advertisement message sent by VRRP Controller 310 immediately after VRRP Controller 300 boots up again.

Figure 4:
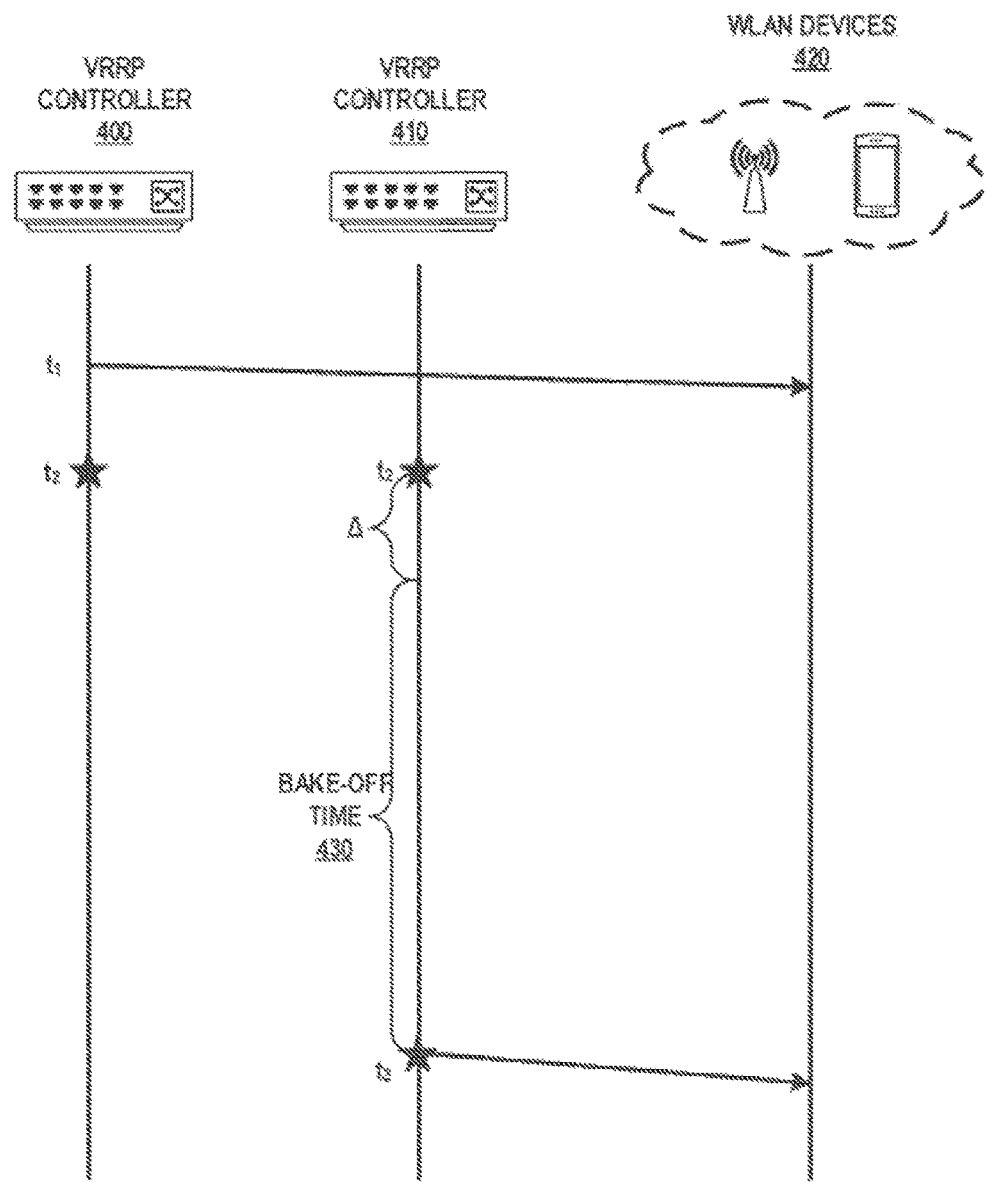
FIG. 4 is a sequence diagram of an example mechanism for avoiding inadvertent pre-emptions over a virtual router redundancy protocol peer.

FIG. 4 is a sequence diagram of an example mechanism for avoiding inadvertent pre-emptions over a virtual router redundancy protocol peer. FIG. 4 includes VRRP Controller 400 and VRRP Controller 410, and a plurality of WLAN devices 420 that include both access points (APs) and client devices. Different network controllers may be designated with different priorities. For example, a master network controller typically will be given a higher priority than a standby or backup network controller. Here, assuming that VRRP Controller 400 is the master network controller, and VRRP Controller 410 is the standby or backup network controller.

As illustrated in FIG. 4 at time point $t_1$, VRRP Controller 400 acting as the master network controller sends control messages to WLAN devices 420 and manages WLAN devices 420. Subsequently, at time point $t_2$, a network disruption causes both VRRP Controller 400 and VRRP Controller 410 become transiently unavailable. When VRRP Controller 410 boots up again, it will first wait for a predetermined period of time, e.g., $\Delta$ seconds. In addition, if within the predetermined period of time, VRRP Controller 410 fails to receive any message from the master network controller (i.e., VRRP Controller 400), VRRP Controller 410 will further wait for a dynamically determined bake-off time period 430. The bake-off time period 430 can be used to differentiate between a transient unavailability of the master network controller and a persistent downtime of the master network controller. The determination of the bake-off time period 430 depends on a number of factors, including but not limited to, the network convergence time, the port availability, the control path and/or data path delays, etc. If after the bake-off time period 430, VRRP Controller 410 still does not receive any message from the master network controller (i.e., VRRP Controller 400), then at time point $t_3$, VRRP Controller 410 will transition to become the master network controller and manage WLAN devices 420.

VRRP Process

Figure 5:
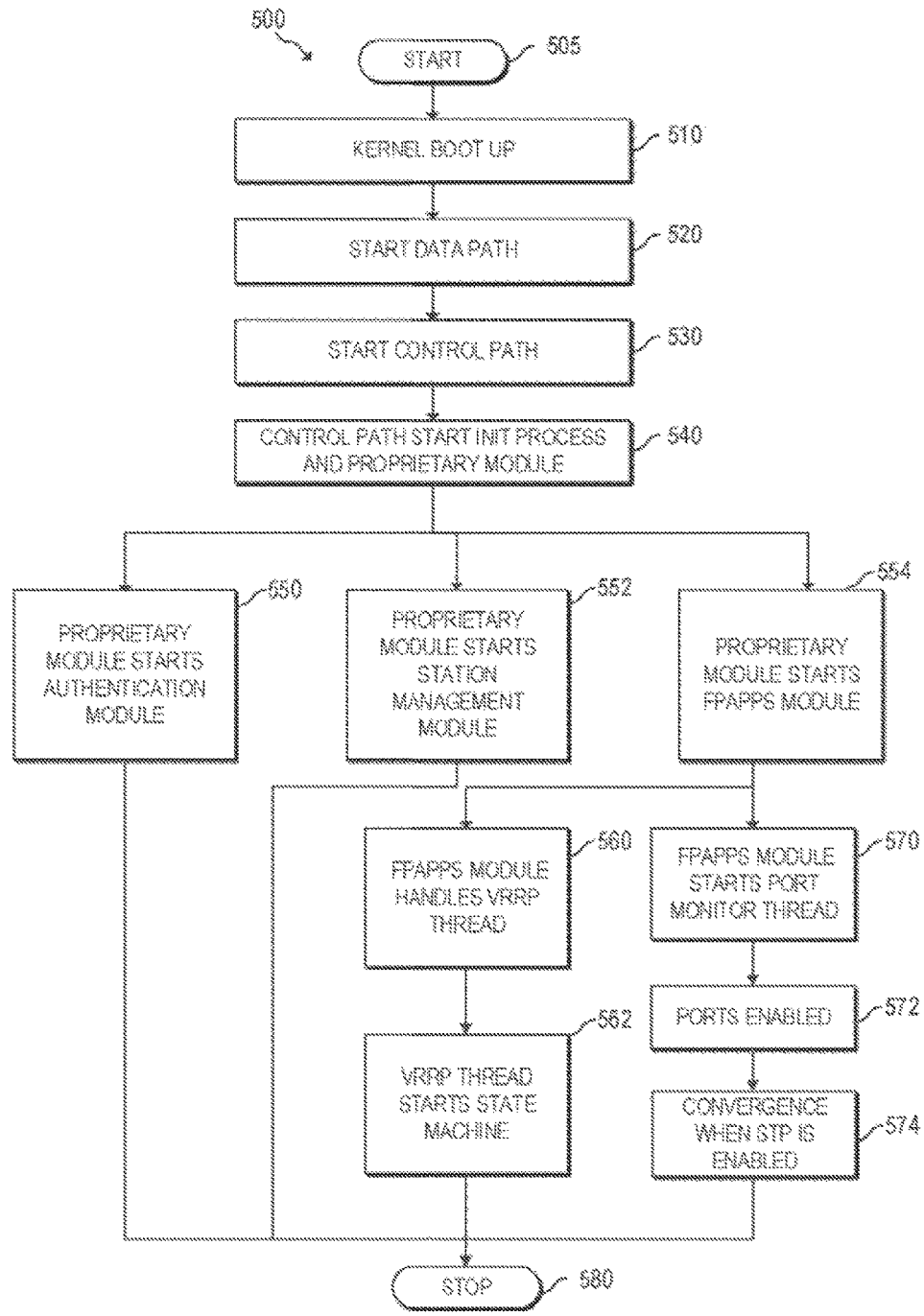
FIG. 5 is a flowchart of example operations of a virtual router redundancy protocol peer.

FIG. 5 is a flowchart of example operations of a virtual router redundancy protocol (VRRP) peer. VRRP peer operations 500 begin at starting point 505. First, the VRRP peer's kernel boots up (operation 510). Then, the VRRP peer starts data path processes (operation 520). The data path processes typically handle data traffic generated by and/or terminated at client devices. Next, the VRRP peer starts control path processes (operation 530). The control path processes typically handle network control or management traffic generated by and/or terminated at network devices (e.g., access points). Thereafter, the control path processes start at least an Init process and a proprietary module (operation 540).

Next, the proprietary module will start a number of other core operating system modules one by one. For example, the proprietary module starts an authentication module auth (operation 550); the proprietary module starts a station management module stm (operation 552); the proprietary module starts an fpapps module (operation 554); etc. The auth module typically manages device authentication. The stm module typically manages network resource usage by client devices. The fpapps module typically manages a network controller's connectivity in layer-2 and layer-3 domains. Note that once initiated, all of the above processes are running in parallel.

Moreover, the fpapps module handles VRRP thread (operation 560) among its numerous parallel threads. Also, the fpapps module starts a port monitor thread port_monitor (operation 570), which is responsible for initiating the ports for the network controller. Usually, all threads are started in parallel by the fpapps module.

After the VRRP thread is initiated, the VRRP thread starts the VRRP state machine (operation 562). This thread runs in parallel with the port monitor thread. Therefore, in the meantime, port monitor thread will get the ports enabled through hardware Application Programming Interfaces (APIs) (operation 572).

Also, when spanning tree protocol (STP) is enabled, the port monitor thread also needs to wait for the STP convergence (operation 574). The STP is a network protocol that ensures a loop-free topology for Ethernet networks. The basic function of STP is to prevent bridge loops and the broadcast radiation that results from them. The STP convergence (also referred to as Layer 2 convergence) happens when the bridges and the switches have transitioned to either a forwarding state or a blocking state.

If the VRRP thread starts the state machine before all ports are enabled and the STP convergence completes, the network controller will not receive any packet from the network, and may therefore erroneously determine that there is no master network controller in the network. This will lead to an inadvertent pre-emption of the VRRP peer that is currently acting as an active master network controller. Therefore, it is important that the network devices according to the present disclosure wait for a bake-off time to determine whether the network is up before starting the VRRP state machine. Once the VRRP state machine is started, it marks the end of the set of VRRP operations (operation 580), and the network device moves on to other operations.

Avoiding Inadvertent VRRP Pre-emptions

Figure 6:
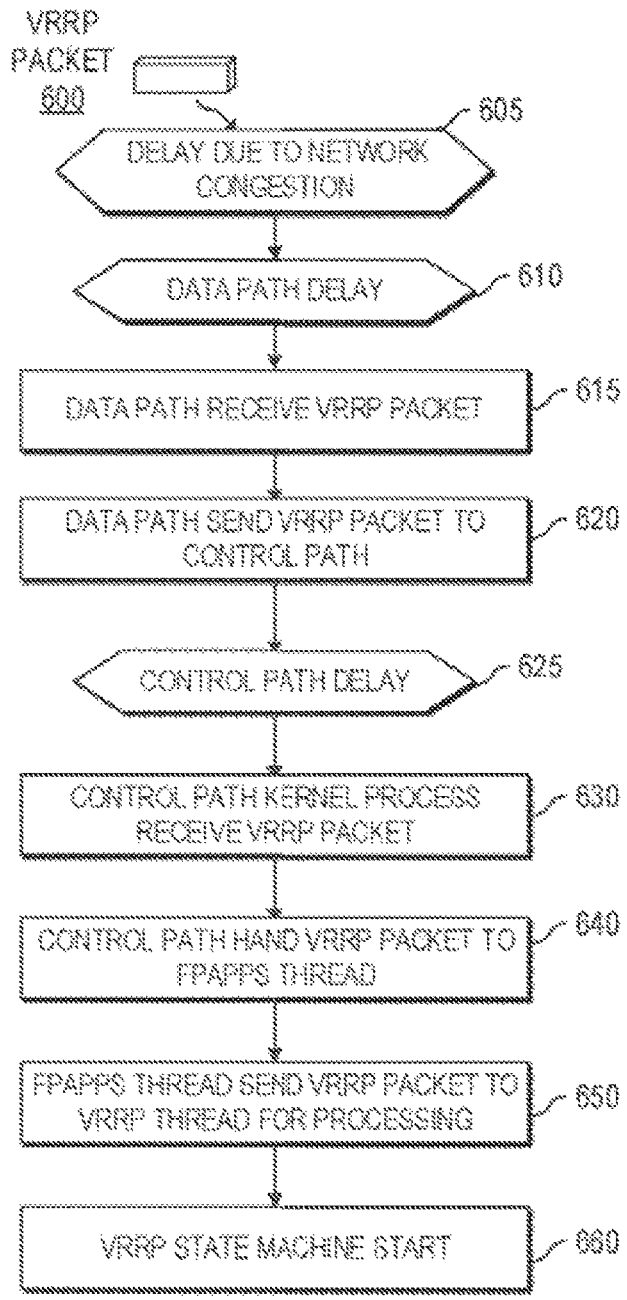
FIG. 6 is a flowchart of an example process on a virtual router redundancy protocol packet with various delays by a network device.

FIG. 6 is a flowchart of an example process on a virtual router redundancy protocol packet with various delays by a network device. Specifically, when a VRRP packet 600 arrives at a network controller, VRRP packet 600 may experience delays due to network congestion 605. Moreover, the network controller may be loaded heavily and the processors may be busy processing other events before they can process VRRP packet 600.

When the network controller begins to process VRRP packet 600, it begins VRRP packet processing with data path processors. Here, the data path processors may experience data path delay 610. Then, the data path processors receive the VRRP packet (operation 615). Next, the data path processors send the VRRP packet to the control path processors (operation 620). Similarly, if the data path processors are loaded, there may be delays sending the VRRP packet to the control path processors. Further, the control path processors may also experience control path delay 625 in processing network packets. Thereafter, the control path kernel process receive the VRRP packet (operation 630). The control path processors will then hand the VRRP packet to fpapps thread for packet processing (operation 640). Next, the fpapps thread sends the VRRP packet to the VRRP thread for processing (operation 650). The VRRP thread will then start the VRRP state machine (operation 660).

In summary, while processing VRRP packet 600, the network controller may experience different delays, including but not limited to, the delay due to network congestion 605, the data path delay 610, the control path delay 625, etc. Even a 100-millisecond delay can have a significant impact when added-up. Moreover, the STP convergence alone could take a long period of time, e.g., up to 30 seconds. Therefore, the total amount of delay time may exceed the predetermined period of time that a network controller, upon booting up, will wait for receiving network packets prior to sending a VRRP advertisement message.

In some implementations, this is solved by configuring a static hold-time by the network administrator. Once the hold-time is configured, when a network controller powers up or when a network port becomes temporarily unavailable, the network controller would wait until the hold-time (in addition to the predetermined period of time) lapses before starting the VRRP state machine. Nevertheless, because the hold-time is statically configured, the VRRP state machine may be started too early or too late.

In some enhanced implementations, the network controller automatically detects whether a VRRP peer is up. Specifically, the network controller can send a multicast ping message for detection of the VRRP peer. Alternatively, the network controller could perform a peer probe using User Datagram Protocol (UDP) based proprietary protocol Application Programming Interfaces (APIs).

Figure 7:
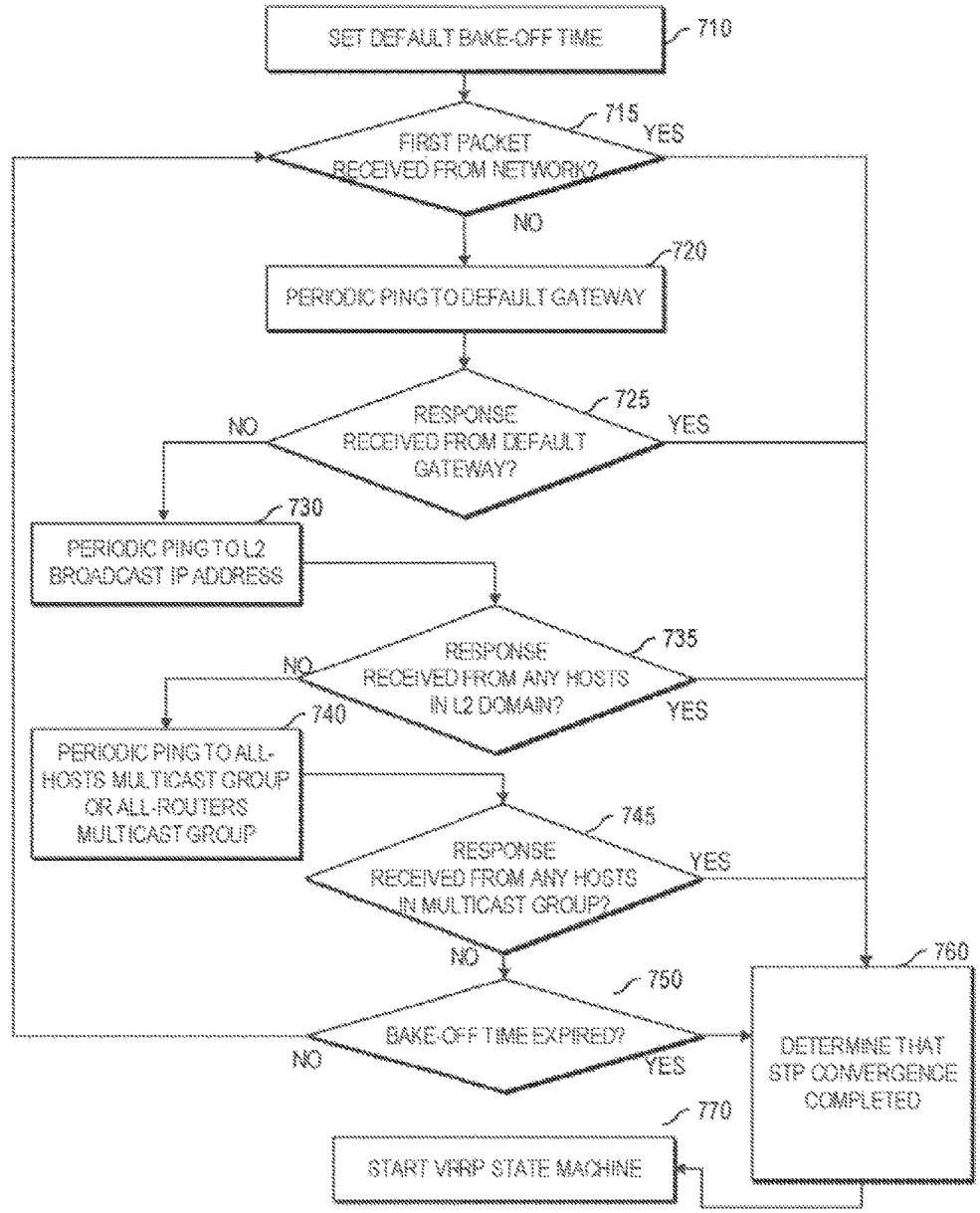
FIG. 7 is a flowchart of an example process for avoiding inadvertent pre-emptions over a virtual router redundancy protocol peer.

FIG. 7 is a flowchart of an example process for avoiding inadvertent pre-emptions over a virtual router redundancy protocol peer. The process illustrated in FIG. 7 is used to determine whether the network is stabilized after the network controller powers up or after a network port becomes temporary unavailable. Specifically, the network controller begins the process by setting a default bake-off time (operation 710). The default bake-off time may be set for 30 seconds, for example, based on the time needed for the STP to converge in the worst case scenario when the basic STP is enabled in the network.

In some cases, the network controller cannot determine the flavor of the STP that each network device in the layer-2 network is running. This is true especially when the STP is disabled on the network controller. Therefore, the network controller also listens to the network traffic and determines whether a first packet is received from the network (operation 715). The first packet can be any type of packet. If so, the network controller determines that the STP convergence has completed (operation 760). Thereafter, the network device then starts the VRRP state machine (operation 770). The arrival of the first packet serves as an indication that the network has stabilized. If the network converges faster than the default bake-off time (e.g., a packet is received prior to 30 seconds), then the VRRP state machine can start sooner.

Another aspect of the present disclosure involves sending periodic ping messages (e.g., sending a ping message every 1 second) by the network controller after the VRRP thread is started. Specifically, in some implementations, if the first packet is not received from the network, the network controller will periodically send a ping message to a default gateway when the default gateway is configured and available (operation 720). Then, the network controller listens for a reply message to determine whether a response is received from the default gateway (operation 725). If the network controller receives a response to the ping message sent to the default gateway, then the network controller can determine that the STP convergence has completed (operation 760). Even though sometimes the default gateway may not be up during system boot-up time, the default gateway typically will be up during a port flap while system is up and running. Thereafter, the network device then starts the VRRP state machine (operation 770).

In some implementations, if no response to the ping message is received from the default gateway, the network controller will periodically send a ping message to the L2 broadcast IP address (operation 730). For example, for network segment with the address space 192.168.1.0/24, the network controller will send the ping message to the broadcast IP address 192.168.1.255. As another example, in an IPv6 network, for the network segment with the address space 2001:feed::/120, the network controller will send the ping message to the broadcast IP address 2001:feed::FF. Then, the network controller listens for a reply message to determine whether a response is received from any hosts in the L2 domain (operation 735). If the network controller receives a response to the ping message from any of the hosts in the L2 broadcast domain, then the network controller can determine that the STP convergence has completed (operation 760). Thereafter, the network device then starts the VRRP state machine (operation 770). If shall be noted that some hosts may not respond to the broadcast ping message. Thus, the mechanisms described herein shall be used in combination to provide better assessment of the network and/or port status.

In addition, if no response to the ping message is received from any hosts in the L2 domain, the network controller can also send a ping message to an all-hosts multicast group (e.g., the multicast group with a multicast address of 224.0.0.1 in an IPv4 network) or an all-routers multicast group (e.g., the multicast group with a multicast address of 224.0.0.2 in an IPv4 network) (operation 740). Alternatively, in an IPv6 network, the network controller can send a ping message to an all-hosts multicast group at the multicast address of ff02::1, or to an all-routers multicast group at the multicast address of ff02::2. The network controller will then listen for a reply to determine whether a response is received from any hosts in the multicast group (operation 745). As mentioned above, some systems may not respond to a multicast ping message. However, if a response to the multicast ping message it received from any of the host in the L2 network, the network controller will determine that the STP convergence has completed (operation 760) and start a VRRP state machine (operation 770).

Next, the network controller determines whether the bake-off time has expired (operation 750). If so, the network controller presumes that the STP convergence has completed (operation 760) and starts a VRRP state machine (operation 770). Otherwise, the network controller continues listening for network traffic to determine whether a first packet is received from the network (operation 715). In some implementations, the first packet is received after the network controller boots up. In some implementations, after a network flap, a period of CPU busy or network latency, the first packet is awaited when a heartbeat message is missed.

After the network controller determines that the STP convergence has completed (operation 760), the network controller presumes that the network is stabilized and that the VRRP state machine can be started without inadvertent pre-emption over the VRRP peer. The network device then starts the VRRP state machine (operation 770).

In some cases, the network may be misconfigured such that the STP convergence is asynchronous. Thus, the above-mentioned mechanisms may not be accurate in those cases. For instance, the link between the VRRP master network controller and the L2 switch may have completed the STP convergence. As a result, the master network controller may receive network packets or reply to the ping messages sent to the default gateway. However, the link between the VRRP standby or backup network controller and the L2 switch may still be converging. Usually, this scenario would not occur if the L2 network is configured properly, especially if the STP configuration is correct. In practice, it is advantageous for the system to be able to handle erroneous setups. Therefore, according to implementations of the present disclosure, a network administrator can override the bake-off time using a static hold-time configuration.

An enhanced system would combine two or more of the aforementioned mechanisms to determine whether the network controller is ready to start the VRRP state machine. If the aforementioned mechanisms fail (e.g., the network controller fails to receive a packet and cannot determine that the network status is stabilized), the system will start a timer that is preset to the default hold-time (e.g., 45 seconds) to provide a safeguard. This increases the likelihood that when the VRRP state machine is started upon the expiration of the timer, the network is stabilized and ready for the VRRP process.

In some implementations, the mechanisms described herein are executed at the time when the network controller boots up. In some implementations, such mechanisms can be executed at any time, when the VRRP standby or backup network controller has missed a VRRP advertisement message from the master network controller, to determine whether the lack of message from the master network controller is due to a temporary network failure, such as a port flap, a network delay, a CPU busy condition, etc. The network controller will not inadvertently pre-empt a master network controller if it determines that the lack of VRRP advertisement messages from the VRRP master network controller is due to a temporary unavailability of the network. The temporary unavailability of the network may be caused by, for example, a network failure or congestion, a port flap at the network device, etc.

As used herein, the term "mechanism" generally refers to a component of a system or device to serve one or mora functions, including but not limited to, software components, electronic components, electrical components, mechanical components, electro-mechanical components, etc.

Process to Indicate Master Network Controller in VRRP

Figure 8:
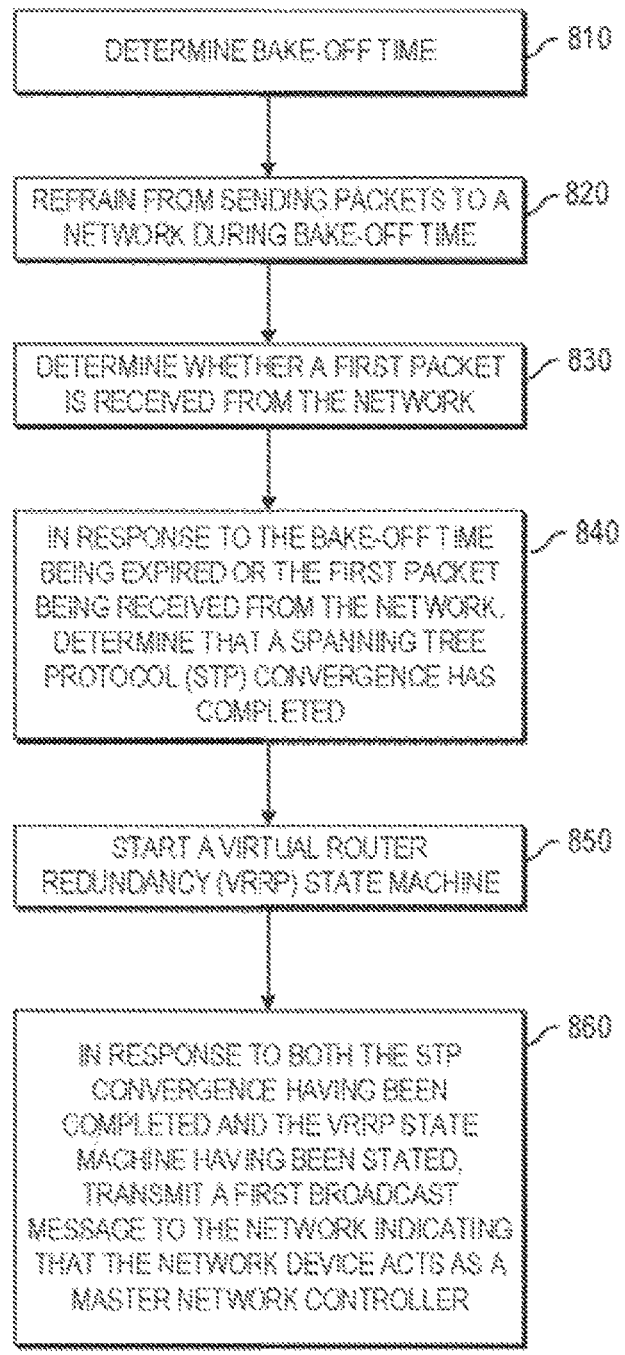
FIG. 8 is a flowchart of an example process for indicating a master network controller in a virtual router redundancy protocol.

FIG. 8 is a flowchart of an example process for indicating a master network controller in a virtual router redundancy protocol. According to FIG. 8, a network device first determines a bake-off time (operation 810). Next, the network device refrains from sending packets to a network during the bake-off time (operation 820). Then, the network device determines whether a first packet is received from the network (operation 830). In response to the bake-off time being expired or the first packet being received from the network, the network device determines that a spanning tree protocol (STP) convergence has completed (operation 840).

Moreover, the network device starts a virtual router redundancy protocol (VRRP) state machine (operation 850). In response to both the STP convergence having been completed and the VRRP state machine having been started, the network device transmits a first broadcast message to the network indicating that the first network device acts as a master network controller in the network (operation 860).

Machine Readable Storage Medium to Indicate Master Network Controller in VRRP

The present disclosure also may be embedded in a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods descried herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 9:
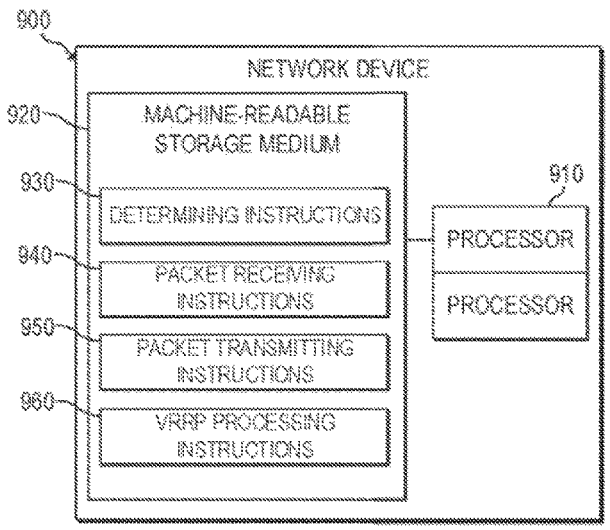
FIG. 9 is a block diagram of an example network device for indicating a mater network controller in a virtual router redundancy protocol.

FIG. 9 is a block diagram of an example network device 900 for indicating a master network controller in a virtual router redundancy protocol. Network device 900 generally includes a device suitable for transmitting and/or receiving network signals and for processing information within such network signals in order to provide network services to client devices, such as, an access point, a network switch, a router, a network controller, a server, a network data center, etc. As illustrated in FIG. 9, network device 900 includes one or more processors 910 and a machine-readable storage medium 920.

Processor 910 may be one or more central processing units (CPUs), CPU cores, semiconductor-based microprocessors, and/or other hardware devices suitable for retrieval and execution of instructions stored in machine-readable storage medium 920. Processor 910 may fetch, decode, and execute instructions 930, 940, 950, and 960 to control the process for indicating the master network controller in the VRRP. As an alternative or in addition to retrieving and executing instructions, processor 910 may include one or more electronic circuits that include electronic components for performing the functionality of one or more of instructions 930, 940, 950, and 960.

Machine-readable storage medium 920 may be any electronic, magnetic, optical, or other physical storage device that contains or stores executable instructions. Thus, machine-readable storage medium 920 may be, for example, Random Access Memory (RAM), an Electrically Erasable Programmable Read-Only Memory (EEPROM), a storage device, an optical disc, and the like. In some implementations, machine-readable storage medium 920 may be a non-transitory storage medium, where the term "non-transitory" does not encompass transitory propagating signals. As described in details below, non-transitory machine-readable storage medium 920 may be encoded with a series of executable instructions 930, 940, 950, and 960 for determining various parameters, network status, and so on; for receiving and transmitting network packets; for processing VRRP; etc.

Specifically, determining instructions 930 include instructions to determine a bake-off time, such that packet transmitting instructions 950 will instruct the one or more processors 910 to refrain from sending packets to a network during the bake-off time. Moreover, determining instructions 930 include instructions to determine whether a first packet is received from the network. Further, determining instructions 930 include instructions to determine that a spanning tree protocol (STP) convergence has completed if the bake-off time is expired or if the first packet has been received from the network. In addition, determining instructions 930 include instructions to start a virtual router redundancy protocol (VRRP) state machine.

In some implementations, determining instructions 930 include instructions to determine that the STP convergence has completed if a response message has been received subsequent to packet transmitting instruction 950 instructing the one or more processors 910 to transmit the ping message to the network.

In some implementations, determining instructions 930 include instructions to determine that a router pre-emption option is enabled in the network. In other implementations, determining instruction 930 include instructions to determine that the router pre-emption option is disabled in the network.

Packet receiving instructions 940 generally include instruction for receiving packets from the network. In particular, packet receiving instructions 940 include instructions to receive a first packet from the network after network device 900 boots up or after a transient unavailability of the network. Furthermore, packet receiving instructions 940 include instructions to receive a reply message subsequent to packet transmitting instructions 950 instruct the one or more processors 910 to transmit a ping message periodically to the network. In some implementations, packet receiving instructions 840 include instructions to receive a heartbeat message from a VRRP network controller within a predetermined period of time. Here, the VRRP network controller may be a master network controller. The heartbeat message may be a VRRP advertisement message indicating that the VRRP network controller is currently acting as the master network controller in the network. The VRRP advertisement message usually is a broadcast message by a network controller to a network segment or domain associated with the network controller.

Packet transmitting instructions 950 generally include instructions to transmit a heartbeat message to the network. The heartbeat message may indicate that the network device acts as a master network controller in the network, if both the STP convergence has been completed and the VRRP state machine has been started.

In some implementations where the router pre-emption option is enabled, if a second priority associated with the heartbeat message received via packet receiving instructions 940 is lower than a first priority associated with the heartbeat message to be transmitted via packet transmitting instructions 950, packet transmitting instructions 950 will instruct one or more processors 910 to transmit the heartbeat message associated with the first priority (i.e., the high priority) to the network.

In some implementations where the router pre-emption option is disabled, if a heartbeat message is received from a second network device (e.g., a VRRP peer) via packet receiving instructions 940 within a predetermined period of time or prior to the bake-off time expires, packet transmitting instructions 950 will instruct one or more processors 910 to keep silent and refrain from transmitting heartbeat messages to the network.

Here, a second priority associated with the heartbeat message received from the network via packet receiving instructions 940 may be lower than a first priority associated with the heartbeat message to be transmitted via packet transmitting instructions 950. Also, the second network device currently acts as the master network controller in the network; and, the first network device currently acts as a backup network controller in the network. Further, the second network device may be unavailable for a transient period of time. Nevertheless, because the router pre-emption option is disabled, the second network device that is associated with a low priority will continue act as the master network controller, even though the first network controller that is associated with a high priority is now available in the network.

Moreover, packet transmitting instructions 950 include instructions to transmit a ping message periodically to the network. In some implementations, packet transmitting instructions 950 include instructions to transmit the ping message to a default gateway in the network. In some implementations, packet transmitting instructions 950 include instructions to transmit the ping message to a data link layer (L2) broadcast address. In some implementations, packet transmitting instructions 950 include instructions to transmit the ping message to an all-host multicast group address. In some implementations, packet transmitting instructions 950 include instructions to transmit the ping message to an all-routers multicast group address.

Network Device to Indicate Master Network Controller in VRRP

Figure 10:
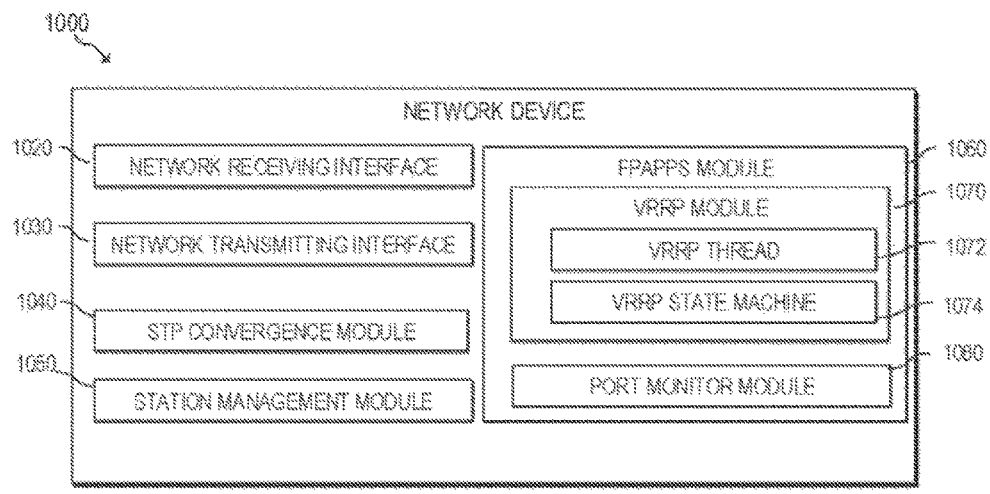
FIG. 10 is a block diagram of an example network device for indicating a master network controller in a virtual router redundancy protocol.

FIG. 10 is a block diagram of an example network device 1000 for indicating a mater network controller in a virtual router redundancy protocol. As with network device 900 of FIG. 9, network device 1000 may be any electronic device suitable for transmitting and/or receiving network signals and for processing information within such network signals in order to provide network services to client devices, such as, an access point, a network switch, a router, a network controller, a server, a network data center, etc. As illustrated in FIG. 10, network device 1000 includes at least a network receiving interface 1020, a network transmitting interface 1030, a STP convergence module 1040, a station management module 1050, an fpapps module 1060, etc. Furthermore, fpapps module 1060 includes at least a VRRP module 1070 and a port monitor module 1080. In addition, VRRP module 1070 further includes a VRRP threat 1072 and a VRRP state machine 1074. All of the above modules can run in parallel.

In particular, network receiving interface 1020 typically is responsible for receiving network messages and/or packets, including but not limited to, a ping message, a VRRP advertisement message, etc. Network transmitting interface 1030 typically is responsible for transmitting network messages and/or packets, including but not limited to, a ping message, a VRRP advertisement message, etc. STP convergence module 1040 typically is responsible for determining whether a spanning tree protocol (STP) convergence has completed. Station management module 1050 typically manages connections between client devices and network devices (e.g., access points) in the network, such that both the client devices and the network as a whole experience high performance.

Further, fpapps module 1060 typically manages a network controller's connectivity in layer-2 and layer-3 domains. Fpapps module 1060 can start a VRRP module 1070 and a port monitor module 1080, among others, as parallel processes.

VRRP module 1070 is responsible for managing the VRRP communications. Specifically, VRRP module 1070 handles a VRRP thread 1072 among numerous parallel threads. After VRRP thread 1072 is started, VRRP module 1070 also starts a VRRP state machine 1074. VRRP state machine 1074 may include, for example, a standby state, a master state, etc.

On the other hand, port monitor module 1074 typically is responsible for initiating the ports for network device 1000. For example, port monitor thread can get the ports enabled through hardware APIs.

In some implementations, when the STP is enabled, port monitor module 1074 will wait for the STP convergence. The STP convergence occurs when the bridges and the switches in the network have transitioned to either the forwarding or blocking state.

The foregoing disclosure describes a number of example implementations for improved network resource redundancy management in a wireless local area network. As detailed above, example implementations provide an intuitive, discoverable mechanism for avoiding inadvertent pre-emption over a VRRP peer in a WLAN. Additional implementations and advantages of such implementations will be apparent to those of skill in the art upon reading and understanding the foregoing description.

We claim:

1. A network device comprising:
   a memory;
   a processor executing instructions stored in the memory to: dynamically determine a bake-off time that distinguishes between a transient unavailability and a persistent downtime of a master network controller;
   refrain from sending packets to a network during the bake-off time;
   in response to the bake-off time being expired or a first packet being received from the network, start a virtual router redundancy protocol (VRRP) state machine; and
   subsequent to determining both that a spanning tree protocol (STP) convergence has completed and that the VRRP state machine has started, transmit a first broadcast message to the network indicating that the network device acts as the master network controller in the network.

2. The network device of claim 1, wherein transmitting the first broadcast message to the network indicating that the network device acts as the master network controller subsequent to determining both that a STP convergence has completed and that the VRRP state machine has started avoids inadvertent preemption of a VRRP peer currently acting as the master network controller.

3. The network device of claim 1, wherein the first packet is received from the network after one of a network device booting up, a port flap, a network delay, and a CPU busy condition.

4. The network device of claim 1, wherein the processor executing the instructions stored in the memory further to transmit a ping message periodically to the network.

5. The network device of claim 3, wherein the ping message is transmitted to one of a default gateway in the network, a data link layer (L2) broadcast address, an all-host multicast group address, and an all-routers multicast group address.

6. The network device of claim 1, wherein the processor executing the instructions stored in the memory further to:

determine whether a response message has been received subsequent to transmitting a ping message; and determine that the STP convergence has completed in response to receiving the response.

7. The network device of claim 1, wherein the processor executing the instructions stored in the memory further to: determine that a router pre-emption option is not configured in the network; receive a second broadcast message from a different network device in the network within a predetermined period of time or prior to the bake-off time expires, and refrain from transmitting broadcast messages to the network in response to determining that the router pre-emption option is not configured in the network.

8. The network device of claim 1, wherein the processor executing the instructions stored in the memory further to: determine that a router pre-emption option is configured in the network; receive a second broadcast message from a different network device in the network within a predetermined period of time; and in response to a second priority associated with the second broadcast message being lower than a first priority associated with the first broadcast message, transmit the first broadcast message to the network.

9. The network device of claim 8, wherein a second priority associated with the second broadcast message is lower than a first priority associated with the first broadcast message.

10. The network device of claim 8, wherein the different network device acts as the master network controller in the network and is unavailable for a transient period of time.

11. The network device of claim 1, wherein the network device is paired up with at least another network device to provide (1) a local network controller redundancy, or (2) a master network controller redundancy, based on a virtual router redundancy protocol (VRRP).

12. A method comprising:
dynamically selecting, by a network device, a bake-off time that distinguishes between a transient unavailability and a persistent downtime of a master network controller;
refraining from sending packets, by the network device, to a network during the bake-off time;
determining, by the network device, whether a first packet is received from the network;
determining, by the network device, that a spanning tree protocol (STP) convergence has completed;
starting, by the network device, a virtual router redundancy protocol (VRRP) state machine; and
transmitting, by the network device, a first broadcast message to the network indicating that the first network device acts as the master network controller in the network.

13. The method of claim 12, wherein transmitting the first broadcast message to the network indicating that the network device acts as the master network controller is subsequent to determining both that a STP convergence has completed and that the VRRP state machine has started, thereby avoiding inadvertent preemption of a VRRP peer currently acting as the master network controller.

14. The method of claim 12, wherein the first packet is received from the network after one of a network device booting up, a port flap, a network delay, and a CPU busy condition.

15. The method of claim 12, wherein the processor executing the instructions stored in the memory further to transmit a ping message periodically to the network and wherein the ping message is transmitted to one of a default gateway in the network, a data link layer (L2) broadcast address, an all-host multicast group address, and an all-routers multicast group address.

16. The method of claim 12, further comprising: determining whether a response message has been received subsequent to transmitting a ping message; and determining that the STP convergence has completed in response to receiving the response.

17. The method of claim 12, further comprising: determining that a router pre-emption option is not configured in the network; receiving a second broadcast message from a different network device in the network within a predetermined period of time or prior to the bake-off time expires; and refraining from transmitting broadcast messages to the network in response to determining that the router pre-emption option is not configured in the network.

18. The method of claim 12, further comprising: determining that a router pre-emption option is configured in the network; receiving a second broadcast message from a different network device in the network within a predetermined period of time; and in response to a second priority associated with the second broadcast message being lower than a first priority associated with the first broadcast message, transmitting the first broadcast message to the network.

19. The method of claim 18, wherein a second priority associated with the second broadcast message is lower than a first priority associated with the first broadcast message, and wherein the different network device acts as the master network controller in the network and is unavailable for a transient period of time.

20. The method of claim 12, wherein the starting of the VRRP state machine is in response to the first packet being received from the network or a spanning tree protocol convergence being completed and wherein the transmitting of the first broadcast message is subsequent to both the spanning tree protocol convergence being completed and the VRRP state machine having been started.

* * * * *